(12) United States Patent
Danziger et al.

(10) Patent No.: US 11,513,352 B2
(45) Date of Patent: Nov. 29, 2022

(54) AUGMENTED REALITY DISPLAY

(71) Applicant: Lumus Ltd., Ness Ziona (IL)

(72) Inventors: Yochay Danziger, Kfar Vradim (IL); Naamah Levin, Rehovot (IL); Elad Sharlin, Mishmar David (IL); Alexander Chayet, Rehovot (IL)

(73) Assignee: LUMUS LTD., Ness Ziona (IL)

( * ) Notice: Subject to any disclaimer, the term of this patent is extended or adjusted under 35 U.S.C. 154(b) by 318 days.

(21) Appl. No.: 16/652,087

(22) PCT Filed: Sep. 23, 2018

(86) PCT No.: PCT/IL2018/051068
§ 371 (c)(1),
(2) Date: Mar. 30, 2020

(87) PCT Pub. No.: WO2019/064301
PCT Pub. Date: Apr. 4, 2019

(65) Prior Publication Data
US 2020/0249481 A1    Aug. 6, 2020

Related U.S. Application Data

(60) Provisional application No. 62/565,135, filed on Sep. 29, 2017.

(51) Int. Cl.
*G02B 6/00* (2006.01)
*G02B 27/01* (2006.01)
(Continued)

(52) U.S. Cl.
CPC ....... *G02B 27/0172* (2013.01); *G02B 6/0035* (2013.01); *G02B 27/0176* (2013.01);
(Continued)

(58) Field of Classification Search
None
See application file for complete search history.

(56) References Cited

U.S. PATENT DOCUMENTS

2008/0106775 A1    5/2008  Amitai et al.
2008/0151379 A1    6/2008  Amitai
(Continued)

FOREIGN PATENT DOCUMENTS

CN    104216120 A      12/2014
CN    204964878 U  *   1/2016

*Primary Examiner* — Michelle M Iacoletti
*Assistant Examiner* — Danell L Owens
(74) *Attorney, Agent, or Firm* — Mark M. Friedman

(57) ABSTRACT

A display has an image projector projecting collimated image illumination along a projection direction, and an optical element having two major surfaces and containing partially reflective surfaces which are internal to the optical element, planar, mutually parallel and overlapping relative to the projection direction. Each ray of the collimated image illumination enters the optical element and is partially reflected by at least two of the partially reflective surfaces so as to be redirected to exit the first major surface along a viewing direction. An alternative implementation, a first reflection from one of the partially reflective surfaces redirects part of the image illumination rays so as to undergo total internal reflection at the major surfaces of the optical element. The rays are then redirected by further reflection from another of the partially reflective surfaces to exit the optical element along the viewing direction.

10 Claims, 10 Drawing Sheets

(51) Int. Cl.
　　　*G02B 27/28*　　　(2006.01)
　　　*F21V 8/00*　　　(2006.01)
(52) U.S. Cl.
　　　CPC ...... *G02B 27/285* (2013.01); *G02B 2027/015* (2013.01); *G02B 2027/0116* (2013.01); *G02B 2027/0123* (2013.01)

(56) References Cited

U.S. PATENT DOCUMENTS

| | | |
|---|---|---|
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0153437 A1 | 6/2009 | Aharoni |
| 2010/0171680 A1 | 7/2010 | Lapidot et al. |
| 2012/0179369 A1 | 7/2012 | Lapidot et al. |
| 2013/0229717 A1 | 9/2013 | Amitai |
| 2013/0276960 A1 | 10/2013 | Amitai |
| 2013/0279017 A1 | 10/2013 | Amitai |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2015/0138451 A1 | 5/2015 | Amitai |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0277127 A1 | 10/2015 | Amitai |
| 2015/0293360 A1 | 10/2015 | Amitai |
| 2016/0116743 A1 | 4/2016 | Amitai |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0341964 A1 | 11/2016 | Amitai |
| 2016/0349518 A1 | 12/2016 | Amitai et al. |
| 2017/0045744 A1 | 2/2017 | Amitai |
| 2017/0052376 A1 | 2/2017 | Amitai |
| 2017/0052377 A1 | 2/2017 | Amitai |
| 2017/0075119 A1* | 3/2017 | Schultz .............. G02B 27/0172 |
| 2017/0276945 A1* | 9/2017 | Yoshida ............. G02B 27/0172 |
| 2017/0336636 A1 | 11/2017 | Amitai et al. |
| 2017/0357095 A1 | 12/2017 | Amitai |
| 2017/0363799 A1 | 12/2017 | Ofir et al. |
| 2018/0039082 A1 | 2/2018 | Amitai |
| 2018/0067315 A1 | 3/2018 | Amitai et al. |
| 2018/0157057 A1 | 6/2018 | Gelberg et al. |
| 2018/0210202 A1 | 7/2018 | Danziger |
| 2018/0267317 A1 | 9/2018 | Amitai |
| 2018/0275384 A1 | 9/2018 | Danziger et al. |
| 2018/0292592 A1 | 10/2018 | Danziger |
| 2018/0292599 A1 | 10/2018 | Ofir et al. |
| 2018/0373039 A1 | 12/2018 | Amitai |
| 2019/0011710 A1 | 1/2019 | Amitai |
| 2019/0056600 A1 | 2/2019 | Danziger et al. |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0278086 A1 | 9/2019 | Ofir |
| 2019/0285900 A1 | 9/2019 | Amitai |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0033572 A1 | 1/2020 | Danziger et al. |
| 2020/0041713 A1 | 2/2020 | Danziger |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150330 A1 | 5/2020 | Danziger et al. |
| 2020/0183159 A1 | 6/2020 | Danziger |
| 2020/0183170 A1 | 6/2020 | Amitai et al. |
| 2020/0200963 A1 | 6/2020 | Eisenfeld et al. |
| 2020/0209667 A1 | 7/2020 | Sharlin et al. |
| 2020/0241308 A1 | 7/2020 | Danziger et al. |
| 2020/0249481 A1 | 8/2020 | Danziger et al. |
| 2020/0278557 A1 | 9/2020 | Greenstein et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0099691 A1 | 4/2021 | Danziger |

* cited by examiner

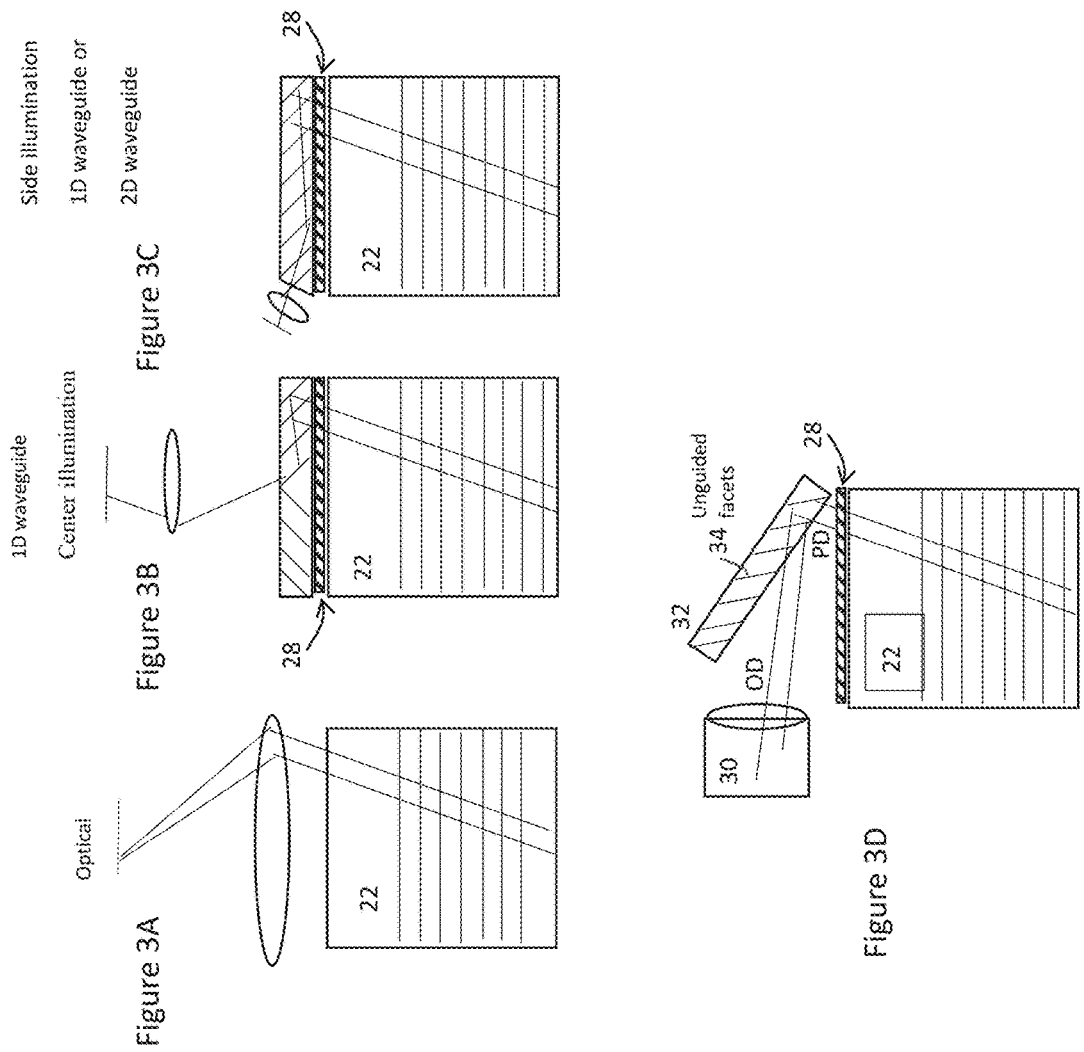

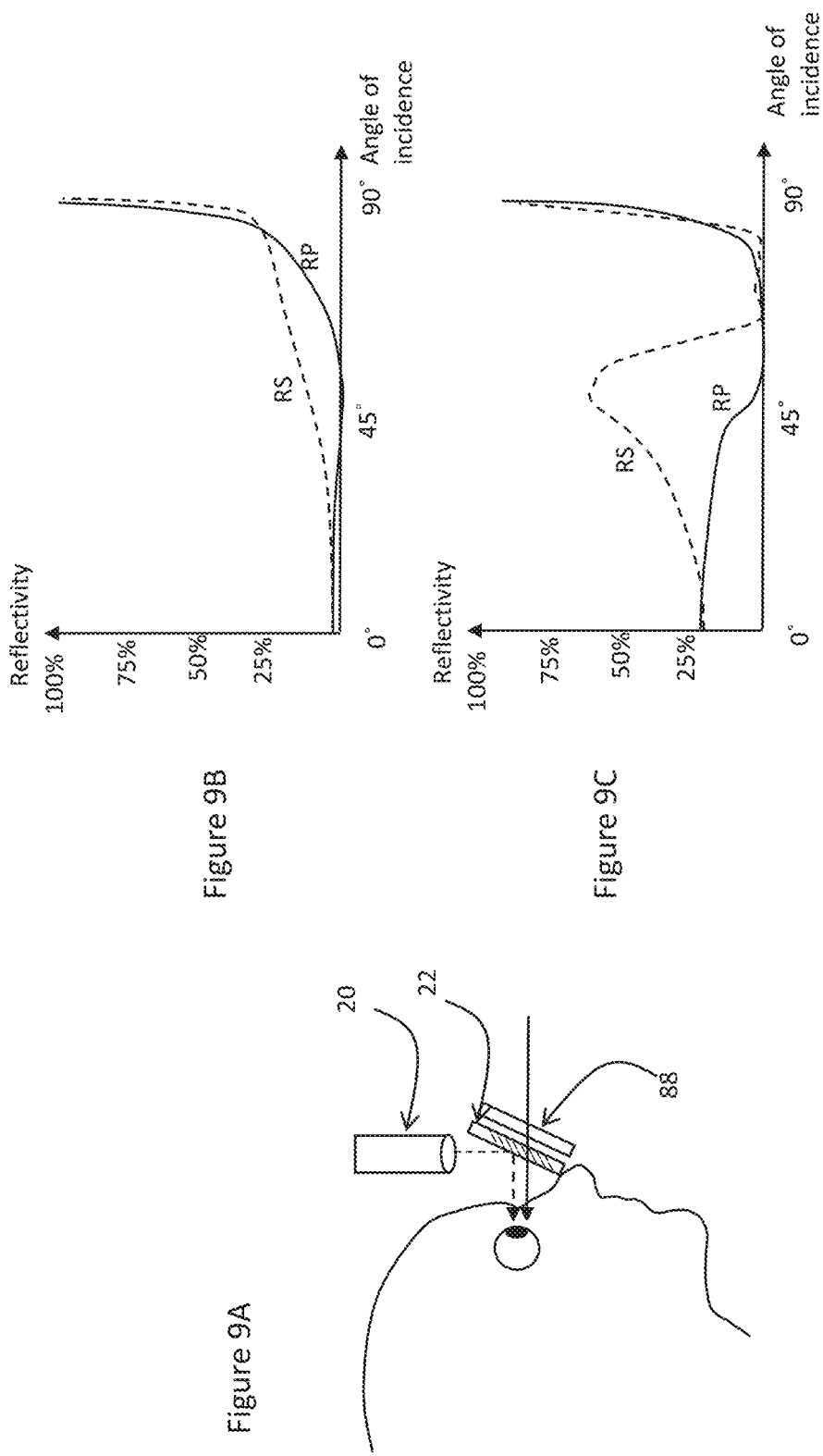

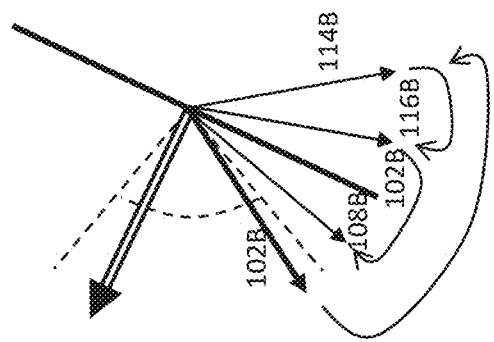
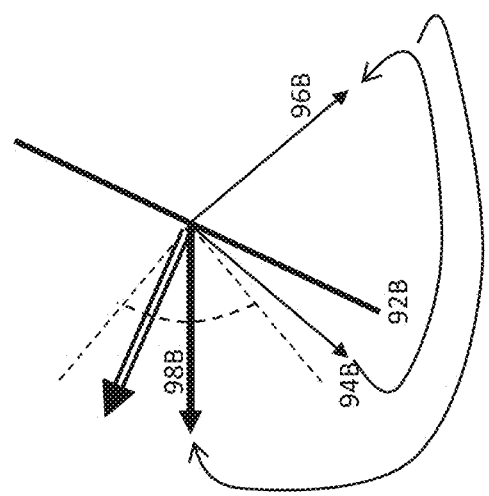
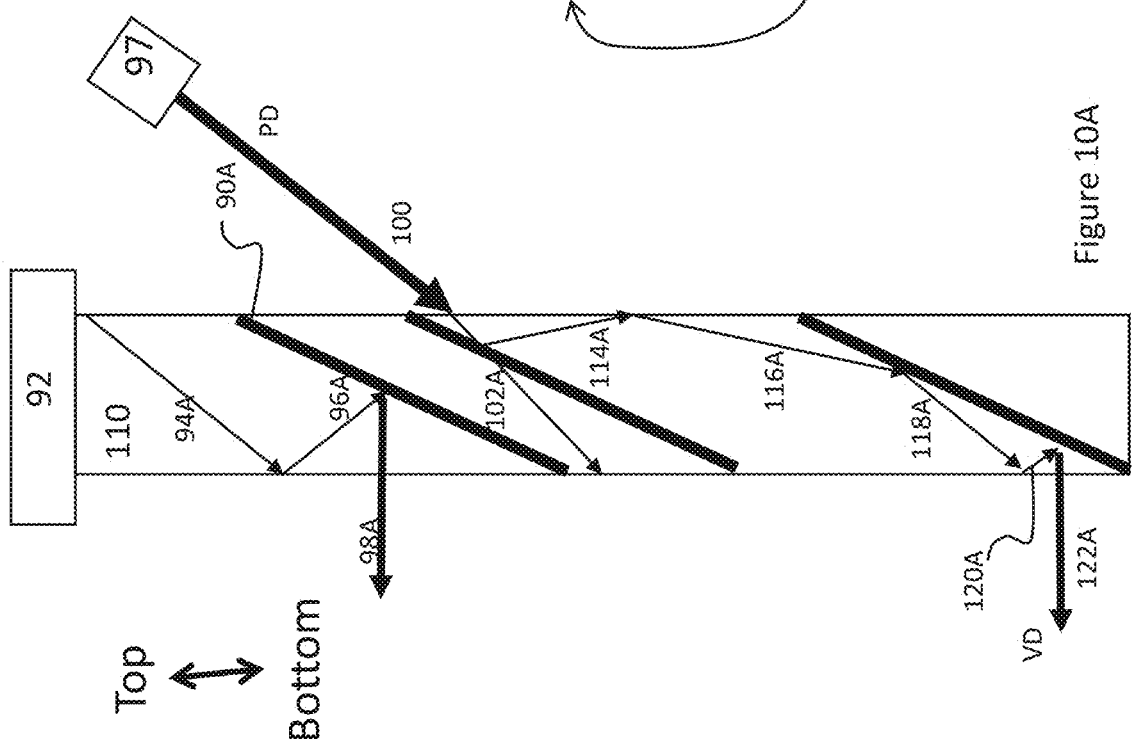
Figure 10C
Figure 10B
Figure 10A

AUGMENTED REALITY DISPLAY

FIELD AND BACKGROUND OF THE INVENTION

The present invention relates to displays and, in particular, it concerns an augmented reality display employing free-space image projection in combination with partially reflective surfaces deployed obliquely within an optical element.

Augmented reality displays are displays which provide an observer simultaneously with a visual display and a view of the real world. Examples of augmented reality displays include head-up displays, where the display is provided via a fixed window, and near-eye displays, where the display is mounted relative to an observer's head, typically either in a glasses-frame form factor or a head-mounted visor. Particularly in the context of near-eye displays, the display needs to be compact. The visibility of the real world should be unperturbed, undistorted and not obscured.

Many near eye display systems utilize a beam splitter architecture in which a partial reflector is deployed at an oblique angle in front of the eye in order to project the virtual image onto the eye while enabling visibility of the world. An arrangement of this type is represented schematically in FIG. 1. The geometrical requirements for the oblique angle of the beam splitter typically render the structure bulky.

An alternative approach to augmented reality displays employs a light-guide optical element in which an image is trapped within a substrate by total internal reflection, and is coupled out of the substrate from a predefined region of the substrate towards the observer's eye. This approach requires a coupling-in arrangement to introduce the image into the light guide so that it becomes trapped by total internal reflection. The light guide substrate requires high precision parallelism of its optical surfaces to preserve image quality through multiple internal reflections.

SUMMARY OF THE INVENTION

The present invention is a display for providing an image to an eye of an observer.

According to the teachings of an embodiment of the present invention there is provided, a display for providing an image to an eye of an observer along a viewing direction, the display comprising: (a) an image projector projecting collimated image illumination along a projection direction; and (b) an optical element formed from at least partially transparent material having first and second major surfaces, the optical element including a plurality of partially reflective surfaces, the plurality of partially reflective surfaces being internal to the optical element, planar, mutually parallel and at least partially overlapping relative to the projection direction, the image projector being deployed relative to the optical element with the projection direction incident on one of the major surfaces and oriented such that each ray of the collimated image illumination enters the optical element and is partially reflected by at least two of the partially reflective surfaces so as to be redirected to exit the first major surface along the viewing direction.

According to a further feature of an embodiment of present invention, the projection direction is incident on the one of the major surfaces at an angle in excess of 50 degrees.

According to a further feature of an embodiment of present invention, the image projector includes a chromatic aberration compensation element modifying the image illumination prior to reaching the one of the major surfaces.

According to a further feature of an embodiment of present invention, the projector comprises an optical aperture expansion arrangement for projecting an image having an elongated effective aperture with a major dimension parallel to an extensional direction of the partially reflective surfaces within the optical element.

According to a further feature of an embodiment of present invention, the optical aperture expansion arrangement comprises a light-guide optical element containing a plurality of partially reflective internal surfaces.

According to a further feature of an embodiment of present invention, the projector comprises an image generator with an output direction, and wherein the optical aperture expansion arrangement comprises an optical expansion element formed from transparent material and including a plurality of partially reflective surfaces, the plurality of partially reflective surfaces being internal to the optical expansion element, planar, mutually parallel and at least partially overlapping relative to the image generator output direction, the image generator being deployed relative to the optical expansion element with the output direction incident on the optical expansion element and oriented such that each ray of the collimated image illumination enters the optical expansion element and is partially reflected by at least two of the partially reflective surfaces so as to be redirected to exit the optical expansion element along the projection direction.

According to a further feature of an embodiment of present invention, the optical element is a planar slab.

According to a further feature of an embodiment of present invention, the optical element is a non-planar slab.

According to a further feature of an embodiment of present invention, the image projector includes a distortion compensation element modifying the image illumination prior to reaching the one of the major surfaces.

According to a further feature of an embodiment of present invention, the optical element is a lens with refractive optical power.

According to a further feature of an embodiment of present invention, the one of the major surfaces on which the projection direction is incident is the first major surface from which the image illumination exits along the viewing direction.

According to a further feature of an embodiment of present invention, the one of the major surfaces on which the projection direction is incident is the second major surface.

According to a further feature of an embodiment of present invention, the partially reflective surfaces are implemented as polarization-selective layers.

There is also provided according to the teachings of an embodiment of present invention, a display for providing an image to an eye of an observer along a viewing direction, the display comprising: (a) an image projector projecting collimated image illumination along a projection direction; and (b) an optical element formed from at least partially transparent material having first and second major surfaces, the optical element including a plurality of partially reflective surfaces, the plurality of partially reflective surfaces being internal to the optical element, planar and mutually parallel, the image projector being deployed relative to the optical element with the projection direction incident on one of the major surfaces and oriented such that each ray of the collimated image illumination enters the optical element and is partially reflected in a first reflection by at least one of the partially reflective surfaces so as to undergo total internal reflection at at least one of the major surfaces, and to be redirected by at least one further reflection from another of the partially reflective surfaces to exit the first major surface along the viewing direction.

According to a further feature of an embodiment of present invention, at least one of the partially reflective surfaces contributes both to the first reflection for a first ray of the image illumination and to the further reflection for a second ray of the image illumination.

BRIEF DESCRIPTION OF THE DRAWINGS

The invention is herein described, by way of example only, with reference to the accompanying drawings, wherein:

FIGS. 3A-3D are schematic front views of the display of FIG. 2A illustrating different options for achieving transverse aperture expansion;

FIG. 9A is a schematic side view of an alternative implementation of a display, constructed and operative according to the teachings of an embodiment of the present invention, for providing an image to an eye of an observer, the display employing polarization management between a virtual image and a real world view;

FIGS. 9B and 9C are graphs showing reflectivity properties for S-polarized and P-polarized light for two types of dielectric coating, respectively, for use on partially reflective surfaces within an optical element of the display of FIG. 9A;

FIG. 10A is an enlarged side view of an optical element for an alternative embodiment of the display of FIG. 6A which combines both unguided and guided display inputs; and FIGS. 10B and 10C are representations in angular space of the ray directions for principle rays along the propagation path for the guided and unguided images, respectively.

DESCRIPTION OF THE PREFERRED EMBODIMENTS

Figure 1:
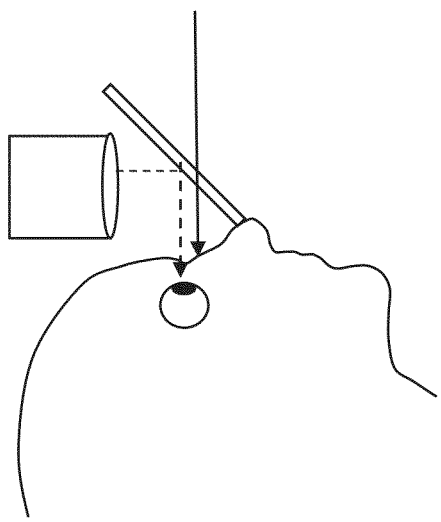
FIG. 1, referred to above, is a schematic illustration of a prior art augmented reality display based on a beam splitter geometry.

The present invention is a display for providing an image to an eye of an observer.

The principles and operation of displays according to the present invention may be better understood with reference to the drawings and the accompanying description.

Referring now to the drawings, FIGS. 2A-10C illustrate various implementations of a display, constructed and implemented according to the teachings of certain embodiments of the present invention, for providing an image to an eye of an observer along a viewing direction VD. In general terms, the display includes an image projector 20 (or 60 or 97, according to the different examples) projecting collimated image illumination along a projection direction PD, and an optical element 22 (or 62, 72 or 110) formed from at least partially transparent material having first and second major surfaces. The optical element includes a plurality of partially reflective surfaces or "facets" 24 (41, 52, 64, 74 or 90A), which are internal to the optical element, planar, mutually parallel and at least partially overlapping as viewed along the illumination direction.

The image projector is deployed relative to the optical element with the projection direction PD incident on one of the major surfaces and oriented such that each ray of the collimated image illumination enters the optical element and is partially reflected by at least two of the partially reflective surfaces so as to be redirected to exit the first major surface along the viewing direction VD.

It will be immediately apparent that the present invention provides critical design flexibility compared to the prior art beam splitter approach of FIG. 1. Specifically, since the facets are deployed at an oblique angle relative to the major surfaces of the optical element, appropriately oriented facets can be provided for incident image projection directions which are shallow relative to the surface of the optical element, thereby allowing the optical element to be deployed in a generally upright orientation and facilitating more compact designs. In this context, "shallow" angles refers to directions which are relatively close to the plane of the surface, corresponding to "high incident angles", where the incident angle is measured relative to a local normal to the surface. In certain particularly preferred implementations of the present invention, the projection direction is incident on one of the major surfaces at an angle in excess of 50 degrees, and in many cases in excess of 60 degrees. Certain particularly preferred implementations employ an angle of incidence of the projection direction in the region of 70 degrees (±5 degrees).

In contrast to the "light-guide" approach of the other aforementioned prior art, the present invention employs free-space (through air) image projection incident on one of the major surfaces of the optical element, where a majority of the incident image illumination is not diverted so as to undergo total internal reflection within the optical element. This relaxes many of the design requirements and limitations that are essential for maintaining image quality for an image propagating within a light-guide. These and other advantages of the present invention will become clearer from the following examples.

Reference is made herein to a "projection direction" and a "viewing direction" of the image illumination. The present invention relates particularly to implementations in which a projected image is collimated to infinity, meaning that the image information for each pixel is a parallel beam of light, and propagates at an angle which corresponds to the position of the pixel. Such an image inherently spans a range of angles corresponding to the field of view (FOV) of the image in air. Within a medium with an increased refractive index, this angular range is compressed, but the remaining properties of the image propagation remain essentially the same.

For the purpose of simplicity of presentation, reference is made herein in the text and drawings to a sole "direction" which corresponds to a central pixel of the image, and is used as a representative ray direction for illustrating propagation of the image illumination. In each implementation, it should be understood that the image is in fact made up of many such rays spanning an image FOV to either side of the representative ray in two dimensions, corresponding to the different pixels of the image. The full FOV as represented by four outermost corner rays (corner pixel directions at the outermost corners of the FOV) is illustrated in the isometric views of the embodiments of FIGS. 4 and 5. Here too, the representative "projection direction" and "viewing direction" correspond to the projection direction and viewing direction for a central pixel of the FOV, although those directions have not been shown in FIGS. 4 and 5 in order to avoid cluttering the drawings.

Turning now to FIG. 2, according to certain embodiments of the present invention as shown here, image projector (or "light projector") 20 projects the image along projection direction PD onto optical element (or "reflecting plate") 22. The reflecting plate 22 includes internal partially reflecting parallel facets 24. The light from the projector (dashed line) refracts into plate 22 (PD') and is then reflected by facets 24 in direction VD' before being refracted out towards the eye of the observer along viewing direction VD.

In this configuration the appropriate angle for deflecting into the observer's eye is determined by the facets and not by the plate. In other words, the angle of incidence of PD and the angle of reflection of VD relative to the external surface of optical element 22 are unequal. Therefore, the plate angle can be steeper than in the regular beam splitter approach of FIG. 1, above, while the reflection angle remains optimal toward the eye. Furthermore, the vertical aperture is preferably multiplied by each ray being partially reflected by a plurality of facets 24, thereby allowing the projecting aperture of image projector 20 to be smaller than the optical aperture of a projector required to implement the arrangement of FIG. 1.

The plate 22 does not have to be flat, as long as the internal facets 24 are parallel, as will be exemplified below with reference to FIG. 5. Thus, plate 22 may be a planar slab or a non-planar slab. This facilitates design of the display using an ergonomic and/or conformal shape. Additionally, the optical element need not be an optically neutral plate, and can alternatively be implemented as a lens with optical power. This allows full integration of an augmented reality display with prescription eye glasses, which may be designed to provide the same optical correction for the virtual image (which in this example passes through the surface nearer the eye twice) and for the view of the real world (passing once through each surface), or may be designed to provide differing optical power correction for each, for example, where a closer focal distance is desired for the virtual image.

In the configuration of FIG. 2 and many other configurations of the present invention, light refracts into the optical element at shallow angle (high angle of incidence) and emerges close to perpendicular. Such a configuration inherently tends to generate chromatic aberration, which is preferably at least partially compensated by providing the image projector with a chromatic aberration compensation element 26 which is deployed to modify the image illumination prior to it reaching the major surface of the optical element 22 projector. The chromatic aberration compensation element (or "chromatic corrector") can be for example either a prism or a diffractive element. Any residual chromatic aberration and field distortion is preferably corrected electronically in the projected image itself. In some cases, this correction is facilitated by using relatively narrow spectrum illumination, such as RGB lasers, so that dispersion of each color of illumination is avoided. Such arrangements for chromatic correction are most preferably used in all implementation of the invention illustrated herein, but are omitted from the drawings for simplicity of presentation.

As already mentioned, it is preferable that the facets 24 have considerable overlap relative to the (refracted) projection direction PD', such that partial reflection of the projected image occurs at multiple facets, thereby achieving optical aperture expansion in one dimension (vertically as illustrated in the drawings here). Additionally, in order to ensure continuity of the viewed image (without dark lines), the facets should minimally give continuous coverage (i.e., one starting where the previous one finished) in the (refracted) viewing direction VD', and for image rays spanning the angular field of view around the VD' direction.

In order to enhance uniformity of the reflected output image, it is preferable that the facets 24 overlap (as depicted in the figure) also in the viewing direction so that averaging of the non-uniformity is obtained. In other words, reflections of different parts of the projected image from different facets are superimposed to contribute to a single output ray. In certain particularly preferred implementations, it may be possible and desirable to arrange the facets so as to have an exact (integer) number of overlapping facets for one or both of the projection direction and the viewing direction. For example, in the Example of FIG. 2B, the dot-dashed line shows the chief ray (refracted projection direction PD') enters the plate and is partially reflected from exactly 4 facets, with the end of each fact being aligned with the beginning of the facet four below it, i.e., with 75% overlap. The refracted viewing direction VD' intersects with exactly two facets, with the end of each facet being aligned relative to the VD' direction with the start of the facet two below it, i.e., 50% overlap. As a result, the total energy reflected by the chief ray across the plate is substantially constant, and the virtual image will appear uniformly illuminated.

If the facets 24 are polarization selective (in many application S-polarization is preferred), the light transmitted from 20 should be correspondingly polarized so as to be reflected from the facets in the intended proportion. Polarization selective partially reflective surfaces can be generated by use of multiple-layer thin film dielectric coatings, as is well known in the art, or by introduction of structural polarizer layers, such as wire grid polarizers. Use of polarization-selective partially reflective facets with high transmission of one polarization helps to ensure that the real world view through multiple facets is not excessively attenuated.

Figure 2B:
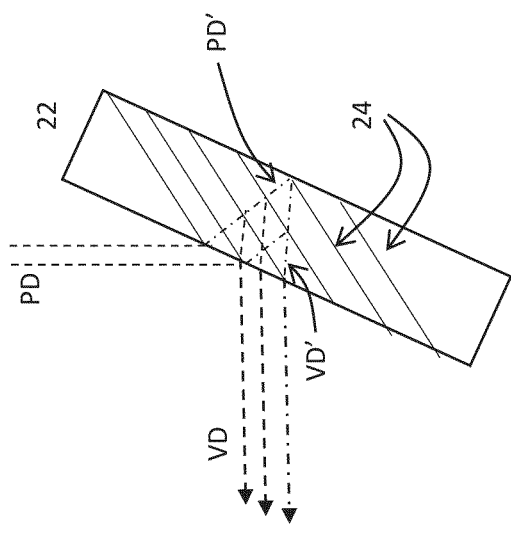
FIG. 2B is an enlarged view of an optical element from the display of FIG. 2A illustrating various ray paths.
Figure 2A:
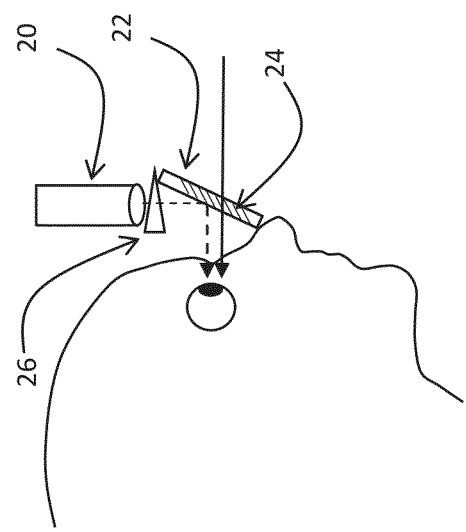
FIG. 2A is a schematic side view of a display, constructed and operative according to the teachings of an embodiment of the present invention, for providing an image to an eye of an observer.

The structure described thus far with reference to FIGS. 2A and 2B achieves optical aperture expansion of the projected image vertically as shown. The lateral aperture of the image projected towards optical element 22 should be sufficiently wide to cover the required field of view over the entire eye box. This laterally expanded projected image can be generated in various ways, as schematically shown in FIGS. 3A-3D.

Optical expansion 3A is based on wide mirrors and/or lenses that create a single lateral aperture. This is the conventional approach to aperture expansion, but may require a relatively large volume. Alternative approaches employing transverse aperture multiplication are described in FIGS. 3B-3D.

In the example of FIG. 3B, a light-guide element is illuminated from the center and guides the image illumination in one dimension to achieve lateral aperture expansion, using an approach described more fully in U.S. Pat. No. 7,643,214 B2.

In the example of FIG. 3C, a light-guide element is illuminated from the side and guides the image illumination in one dimension to achieve lateral aperture expansion, using an approach described more fully in WO 2015/162611 A1, or using a rectangular cross-section light guide to guide the image light in two dimensions, as described in PCT Patent Application Publication No. WO 2018/065975 A1, which was unpublished on the priority date of this application and does not constitute prior art.

FIG. 3D illustrates a further optional implementation according to a further aspect of the present invention in which an arrangement essentially similar to that of FIGS. 2A and 2B is used in a rotated orientation to achieve transverse aperture multiplication for projecting onto the optical element 22. Thus, in the implementation schematically illustrated here, the projector includes an image generator 30 with an output direction OD, and the optical aperture expansion arrangement is implemented as an optical expansion element 32 formed from transparent material and including a plurality of partially reflective surfaces 34 which are internal to the optical expansion element, planar, mutually parallel and at least partially overlapping relative to the image generator output direction. The image generator 30 is deployed relative to the optical expansion element 32 with the output direction incident on the optical expansion element and oriented such that each ray of the collimated image illumination enters the optical expansion element and is partially reflected by at least two of the partially reflective surfaces so as to be redirected to exit the optical expansion element along the projection direction. The arrangement achieves a first (horizontal as shown) dimension of optical aperture expansion prior to the image reaching optical element 22 at which a second (vertical as shown) dimension of optical aperture expansion occurs.

In each of the options illustrated in FIGS. 3B-3D, the polarization may be changed as the light transfers from the lateral to the vertical aperture expansions. This can be achieved using a polarization management component 28 (such as a wave-plate and/or a polarizer).

Figure 4:
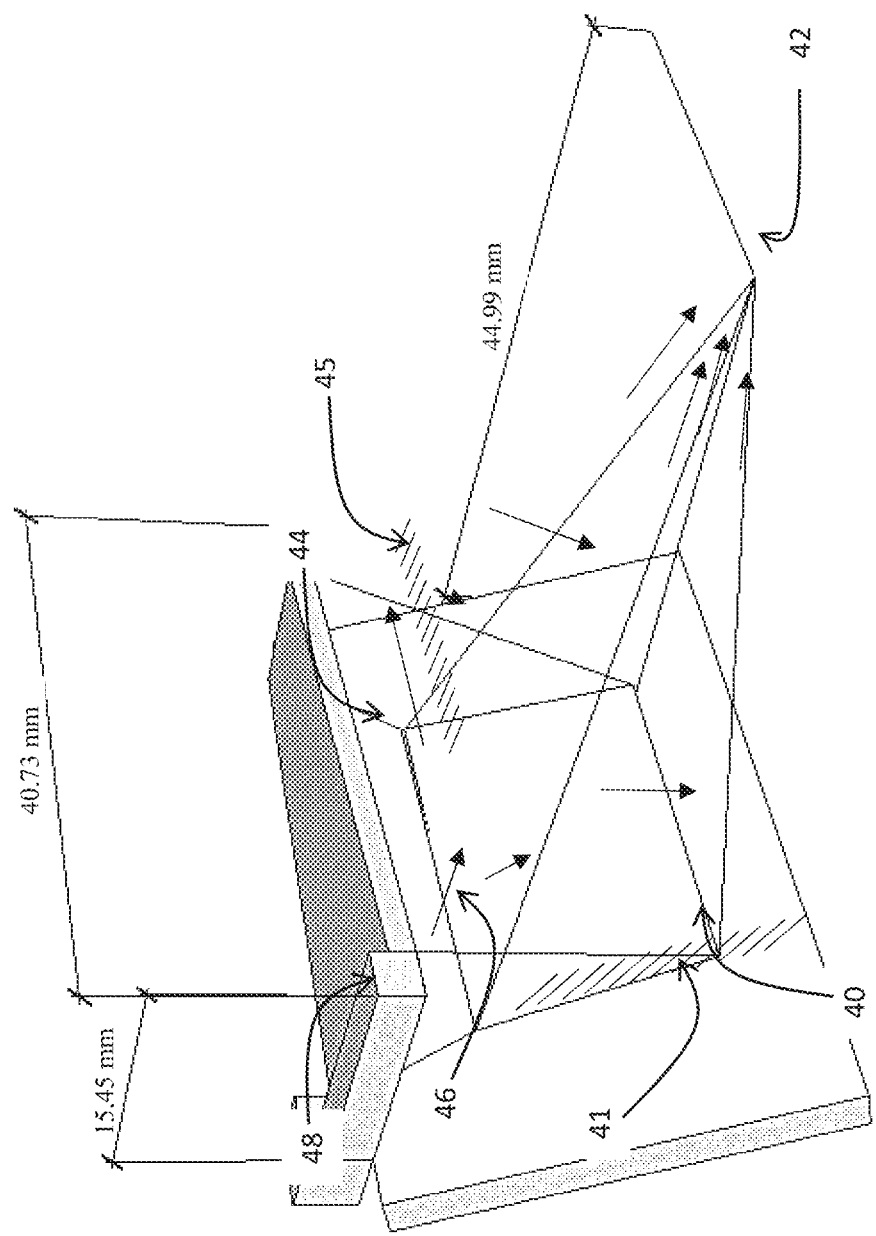
FIG. 4 is a schematic isometric view illustrating an implementation of the display of FIG. 2A using an optical element implemented as a flat plate.

Turning now to FIG. 4, this illustrates an exemplary implementation of the present invention including exemplary dimensions of such system where a planar vertical aperture-multiplication plate 40 has internal parallel facets 41 and is at an inclination of 20° to vertical. The Field of view is defined to be 32°×18° and the distance from the plate to the center of eye rotation 42 was defined as 45 mm. The lateral aperture expansion is provided by a 1D light-guide 44 that has internal facets 45, generating an output aperture projecting downwards. The dimensions of this projector arrangement in one example were 15.45 mm×40.73 mm. In this example, the optical expansion arrangement in the projector is implemented according to the principles of FIG. 3C. Light-guide 44 can be illuminated by optics or through another longitudinal aperture expansion 46 which is illuminated by a small optical image generator and its associated collimating optics 48.

In this implementation, chromatic aberration can be compensated for by tilting (not depicted) the light-guide 44 to generate an opposite chromatic aberration. Thus, for example, in the implementation illustrated here, light-guide 44 would be tilted about an axis along its length in a clockwise direction as shown in this view.

Figure 5:
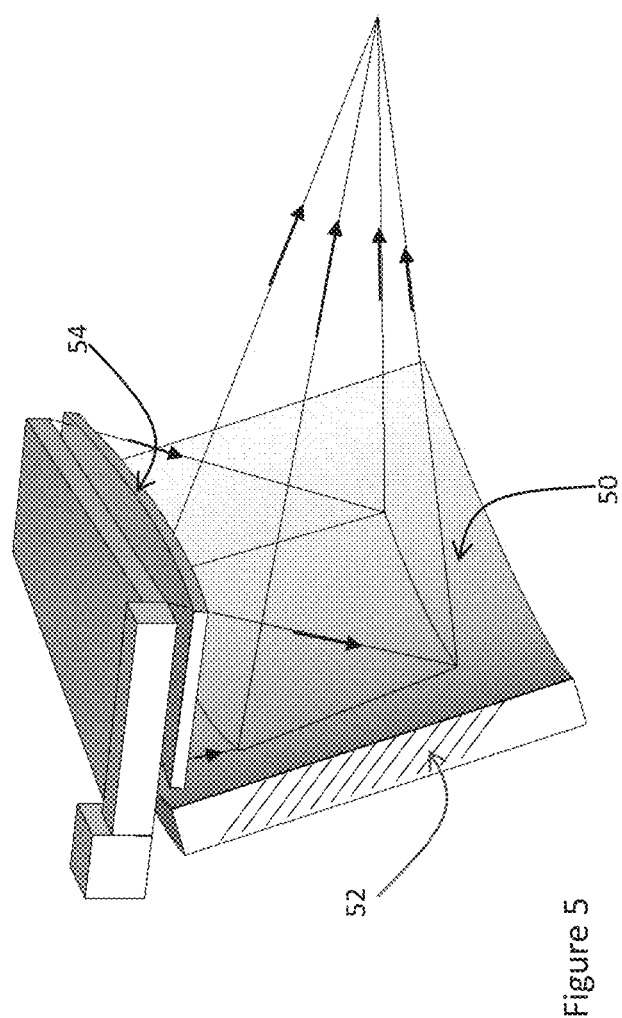
FIG. 5 is a schematic isometric view illustrating an implementation of the display of FIG. 2A using an optical element implemented as a plate with curvature.
Figure 6B:
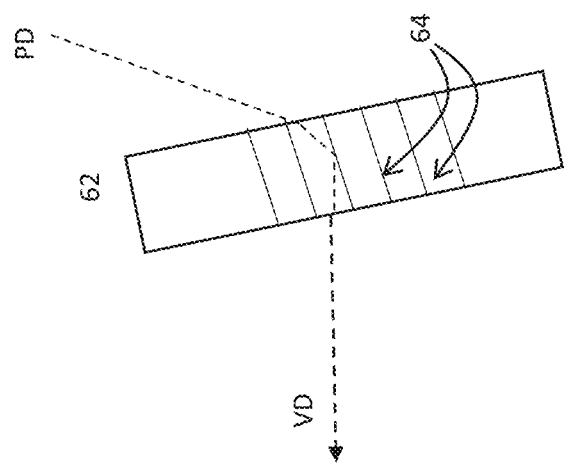
FIG. 6B is an enlarged view of an optical element from the display of FIG. 6A illustrating various ray paths.
Figure 6A:
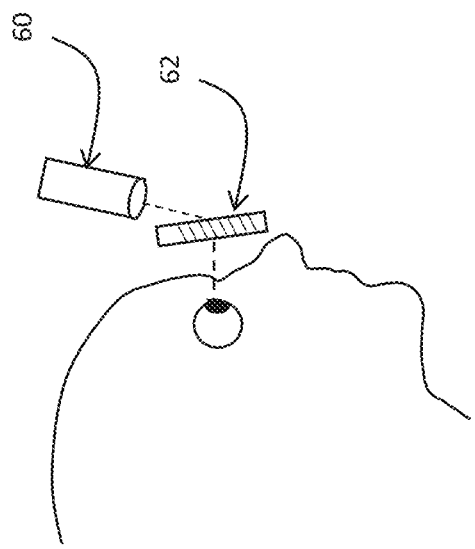
FIG. 6A is a schematic side view of an alternative implementation of a display, constructed and operative according to the teachings of an embodiment of the present invention, for providing an image to an eye of an observer.

Turning now to FIG. 5, this illustrates a similar arrangement to FIG. 4 in which the plate 50 (equivalent to plane plate 40) is curved, while the internal facets 52 are still planar and parallel. Since the viewed image is reflected from internal facets within the plate, the surface curvature has very minor effect on the reflected light. This configuration thus allows reflection towards the viewing direction of a virtual image focused to infinity together with aperture multiplication, all with minimal distortions. The minor residual distortions of the virtual image may be pre-compensated by a compensation element 54, typically implemented as an astigmatic or free-form lens which will be designed for the specific shape of each plate 50 by use of computer-implemented numerical methods, using standard software tools that are well known in the field of optical element design.

All of the implementations of the present invention illustrated thus far have shown "rear-illuminated" implementations, i.e., where entry of the projected image and exit of the reflected image along the viewing direction occur at the same surface, facing the eye of the observer. It should be noted however that alternative implementations for all of these embodiments may employ "front-illuminated" implementations, in which the image projection occurs from the side of the optical element further from the eye of the observer. An exemplary implementation of this type is illustrated here with reference to FIGS. 6A and 6B. Thus, a projector 60 is here located on the opposite side from a plate 62 from the eye of the observer. The internal facets 64 are deployed at an angle optimized to reflect the virtual image toward the observer. All of the aforementioned options relating to transverse expansion of the optical aperture and planar or non-planar optical elements, with or without optical power, are all applicable equally using a front-illuminated geometry.

Figure 7:
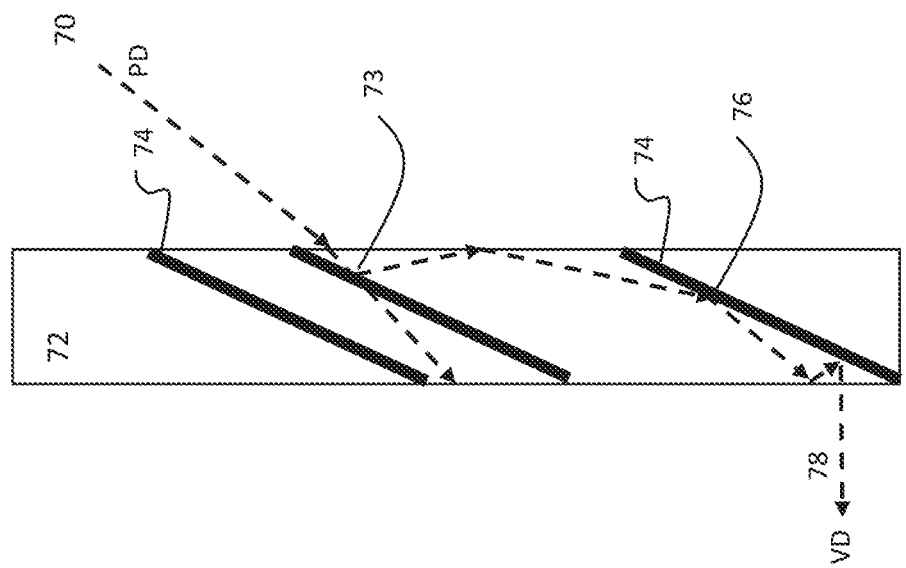
FIG. 7 is an enlarged view of an optical element for an alternative embodiment of the display of FIG. 6A.

Turning now to FIG. 7, the present invention is distinguished from the aforementioned light-guide approach of certain prior art in that the image illumination is introduced into the optical element in such a manner that at least part of the illumination that is transmitted by the facets passes through the optical element without being trapped or "guided" by internal reflection. Nonetheless, implementations in which a part of the image illumination is reflected within the plate so as to undergo one or more internal reflection from the major face(s) of the optical element also fall within the scope of the present invention. One such example is illustrated in FIG. 7. In this case, an exemplary ray of image illumination 70 enters light-guide 72 and impinges at point 73 on a facet 74. After reflection by the facets, the light is at a shallow angle to the major surfaces of the plate/light-guide, and therefore propagates by Total Internal Reflection (TIR) within light-guide 72. A second reflection 76 by facets 74 projects the light along line 78 along the viewing direction VD towards the observer.

Thus, in this embodiment, unlike the previous examples, the first reflection at one of the facets does not direct the image illumination along the viewing direction. Instead, the first reflection from one of the facet redirects part of the image illumination rays so as to undergo total internal reflection at at least one of the major surfaces of the plate. The rays are then redirected by at least one further reflection from another of the facets to exit the first major surface along the viewing direction. The illumination is referred to here as "partially guided" in the sense that it undergoes one or more internal reflection from the major surface(s) of the plate. Nevertheless, since the image illumination only passes a relatively short distance along within the plate, the optical performance is much less sensitive to imperfections in the optical quality and parallelism of the major surfaces of the plate. The facets responsible for the "first reflection" are essentially similar to the facets responsible for the "further reflection", and in particularly preferred implementations, at least one of the partially reflective surfaces contributes both to the first reflection for a first ray of the image illumination and to the further reflection for a second ray of the image illumination.

Notably, in the embodiment of FIG. 7, the facets are not necessarily overlapping relative to the (refracted) projection direction, and aperture expansion is achieved in part by the effective overlap of the facets relative to the first-reflected rays and/or their reflections from the major surfaces of the plate. Continuous coverage by the facets relative to the refracted projection direction is typically preferable. In all embodiments, continuous coverage by the facets relative to the refracted viewing direction is highly desirable in order to avoid dark lines in the virtual image.

According to various particularly preferred embodiments of the present invention, minimal or no guidance of the light is needed by internal reflection within the optical element. The invention therefore lends itself to implementation using a medium such as plastic, despite some distortions and birefringence which may be introduced. Various non-limiting approaches to manufacturing optical elements incorporating the required facets using plastic are described here with reference to FIGS. 8A and 8B.

Figure 8B:
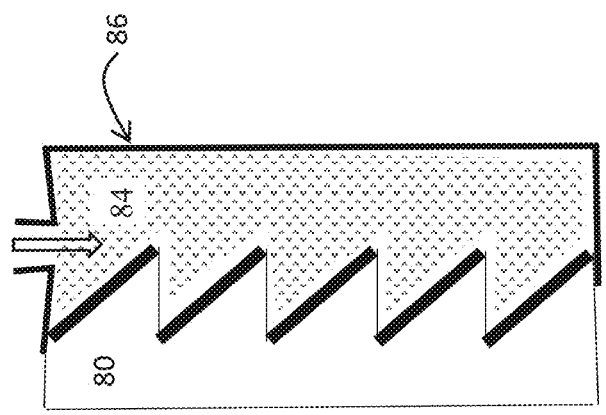
FIGS. 8A and 8B are schematic cross-sectional views illustrating techniques for manufacturing the optical element of any of the above embodiments.
Figure 8A:
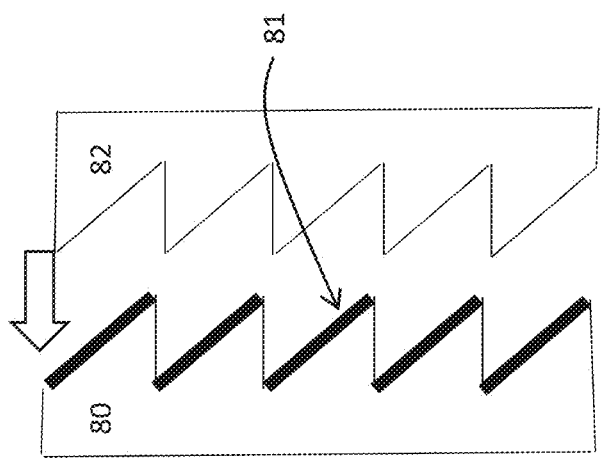

In FIG. 8A, part 80 is made of molded plastics and coated with appropriate reflector coatings 81. A complementary part 82 is also made of plastic having the same refractive index, and the two are attached together.

FIG. 8B shows an alternative method in which part 80 and reflector coatings 81 are prepared as above, and are then deployed in a mold 86 within which complementary part 84 is molded directly so as to form a unitary structure with part 80.

As mentioned earlier, the partially reflective surfaces of the various implementations of the present invention may be implemented as polarization-selective layers. FIGS. 9A-9C address in more detail certain implementations utilizing polarization management.

The facet coatings can be based on dielectric or metallic coating which provide partial reflection. In many cases, this coating will have inherent polarization dependence. It is preferred that light from the real world will not be reflected by the facet coating while a proportion of the light from the projector will be reflected to the observer's eye. In FIG. 9A, this selective reflection is achieved by using polarization selective coating that transmit the P polarization and reflect S. A polarizer 88 is placed in front of the plate 22. The projector transmits S polarization that is reflected by the facets towards the observer, while the polarizer transmits only the P polarization from the outside world.

FIGS. 9B and 9C show reflectivity properties for two types of dielectric coatings which may be used for the facets in a plate having a refractive index of 1.6. Close to 50 degrees angle of incidence, there is the highest separation between the transmittance of P and reflection of S. Angles of this range, for example, in the 45-55° range, are therefore good angles for the inclination between (the normal to) the facets and the viewing direction.

Other coatings can be used that render the properties of the facets more advantageous for a larger angular range. Additional options include the use of wire-grid films (commercially available, for example, from Moxtek Inc. of Utah, USA) or birefringent dielectric coating (commercially available, for example, from the 3M Company of Minnesota, USA).

Transmittance of the P polarized light from the projector into the plate can be improved by designing the angle of incidence on the surface of the plate to be close to the Brewster angle. For example for n=1.8, this angle will be approximately 61 degrees.

Turning finally to FIGS. 10A and 10B, it should be noted that the present invention that employs projection of unguided image illumination can be implemented in combination with a guided image projector.

FIG. 10A shows a light-guide having facets 90A. Guided-image projector 92 injects the image light 94A that reflects as 96A and is coupled out of the light-guide as 98A. The vectors of the same rays are shown in FIG. 10B having the same number with suffix B.

According to an aspect of the present invention, a second projector 97 is included in the system that projects unguided image illumination onto the light-guide along projection direction PD. The light 100 refracts into the light-guide 102A and reflects from facet 90A as 114A. After reflection from external face as 116A, the ray reflects once more from facet 90A as 118A. The ray 118A is equivalent (parallel) to 94A, and will therefore reflect as 120A and be coupled-out of the light-guide as 122A (equivalent to 98A) in the viewing direction VD.

The vectors of this reflection process are shown in angular space in FIG. 10C with same numbers but having suffix B.

It will be appreciated that the above descriptions are intended only to serve as examples, and that many other embodiments are possible within the scope of the present invention as defined in the appended claims.

What is claimed is:

1. A display for providing an image to an eye of an observer along a viewing direction, the display comprising:
  (a) an image projector projecting collimated image illumination along a projection direction, said image projector comprising:
    (i) an image generator with an output direction, and
    (ii) an optical aperture expansion arrangement for projecting an image having an elongated effective aperture with a major dimension parallel to an extensional direction of said partially reflective surfaces within said optical element, said optical aperture expansion arrangement comprising an optical expansion element formed from transparent material and including a plurality of partially reflective surfaces, said plurality of partially reflective surfaces being internal to said optical expansion element, planar, mutually parallel and at least partially overlapping relative to the image generator output direction, said image generator being deployed relative to said optical expansion element with said output direction incident on said optical expansion element and oriented such that each ray of said collimated image illumination enters said optical expansion element and is partially reflected by at least two of said partially reflective surfaces so as to be redirected to exit said optical expansion element along the projection direction; and
  (b) an optical element formed from at least partially transparent material having first and second major surfaces, said optical element including a plurality of partially reflective surfaces, said plurality of partially reflective surfaces being internal to said optical element, planar, mutually parallel and at least partially overlapping relative to the projection direction,
  said image projector being deployed relative to said optical element with said projection direction incident on one of said major surfaces and oriented such that each ray of said collimated image illumination enters said optical element and is partially reflected by at least two of said partially reflective surfaces so as to be redirected to exit said first major surface along the viewing direction.

2. The display of claim 1, wherein said projection direction is incident on said one of said major surfaces at an angle in excess of 50 degrees.

3. The display of claim 2, wherein said image projector includes a chromatic aberration compensation element modifying said image illumination prior to reaching said one of said major surfaces.

4. The display of claim 1, wherein said optical element is a planar slab.

5. The display of claim 1, wherein said optical element is a lens with refractive optical power.

6. The display of claim 1, wherein said one of said major surfaces on which said projection direction is incident is said second major surface.

7. The display of claim 1, wherein said partially reflective surfaces are implemented as polarization-selective layers.

8. A display for providing an image to an eye of an observer along a viewing direction, the display comprising:
 (a) an image projector projecting collimated image illumination along a projection direction; and
 (b) an optical element formed from at least partially transparent material having first and second major surfaces, said optical element including a plurality of partially reflective surfaces, said plurality of partially reflective surfaces being internal to said optical element, planar, mutually parallel and at least partially overlapping relative to the projection direction, said image projector being deployed relative to said optical element with said projection direction incident on one of said major surfaces and oriented such that each ray of said collimated image illumination enters said optical element and is partially reflected by at least two of said partially reflective surfaces so as to be redirected to exit said first major surface along the viewing direction, and wherein said optical element is a non-planar slab.

9. The display of claim 8, wherein said image projector includes a distortion compensation element modifying said image illumination prior to reaching said one of said major surfaces.

10. A display for providing an image to an eye of an observer along a viewing direction, the display comprising:
 (a) an image projector projecting collimated image illumination along a projection direction; and
 (b) an optical element formed from at least partially transparent material having first and second major surfaces, said optical element including a plurality of partially reflective surfaces, said plurality of partially reflective surfaces being internal to said optical element, planar, mutually parallel and at least partially overlapping relative to the projection direction, said image projector being deployed relative to said optical element with said projection direction incident on one of said major surfaces and oriented such that each ray of said collimated image illumination enters said optical element and is partially reflected by at least two of said partially reflective surfaces so as to be redirected to exit said first major surface along the viewing direction, and wherein said one of said major surfaces on which said projection direction is incident is said first major surface from which said image illumination exits along the viewing direction.

\* \* \* \* \*